Sept. 24, 1946.   L. T. MILLER   2,408,266
AUTOMATIC DILUTION SYSTEM CONTROL VALVE
Original Filed Oct. 3, 1942   2 Sheets-Sheet 1

INVENTOR.
LESLIE T. MILLER
BY
Donald W. Farrington
ATTORNEY

Sept. 24, 1946.  L. T. MILLER  2,408,266
AUTOMATIC DILUTION SYSTEM CONTROL VALVE
Original Filed Oct. 3, 1942  2 Sheets-Sheet 2
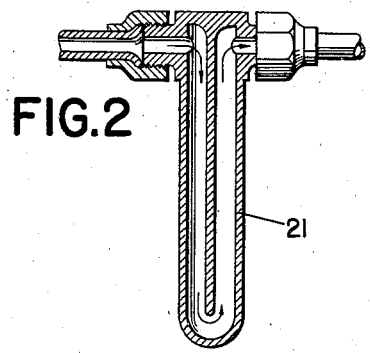
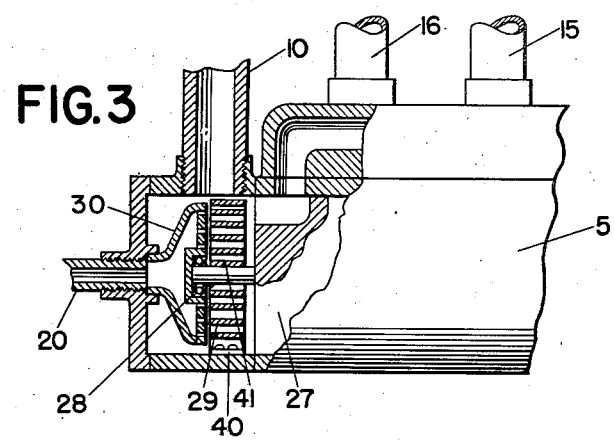
INVENTOR.
LESLIE T. MILLER
BY
*Donald W. Farrington*
ATTORNEY Patented Sept. 24, 1946

2,408,266

UNITED STATES PATENT OFFICE 2,408,266

AUTOMATIC DILUTION SYSTEM CONTROL VALVE

Leslie T. Miller, Stoneleigh, Md., assignor to The Glenn L. Martin Company, Middle River, Md., a corporation of Maryland Original application October 3, 1942, Serial No. 460,642. Divided and this application January 15, 1944, Serial No. 518,368

3 Claims. (Cl. 123—196)

This invention relates to a cold weather lubrication system and is particularly directed to the lubricant flow control valve.

This application is a division of application Serial No. 460,642, filed October 3, 1942, which relates to a cold weather lubrication system and is particularly directed to the system of which this valve is a vital part.

The parent application sets forth novel structural features and functions of an improved lubrication system wherein the dependability and efficiency are increased by the automatic operation of the elements of the system.

The difficulty of starting an internal combustion engine in cold climates is well known. This system is designed to overcome this difficulty by providing a certain and definite quantity of lubricant of low viscosity for the engine during the starting period. The general feature of this system consists of adding a diluent, such as gasoline, to the lubricant in the return line from the engine to the reservoir.

The primary object of this invention is to provide a system wherein this diluent may be added to the return line and automatically, by means of the flow control valve, control the flow of fluid in a predetermined manner.

Another object is the provision of means whereby, when the diluent is added, the lubricant is directed through a return line to the warm-up compartment of the reservoir rather than the main section of the reservoir.

Another object is that in the construction and arrangement of the valve, a by-pass is always provided when the oil is cold. When the oil is cold and most viscous and liable to create excessive pressures, the valve affords a wide open by-pass around the cooler, thus protecting it from damage. Relief valves might be used but they do not function until the pressure builds up while the open by-pass prevents the building up of excessive pressures. In case of a surge of pressure, damage to the cooler might occur before the relief valve functions, while an open by-pass is positive protection for the cooler.

Further objects of the invention will become apparent from the accompanying description of the drawings which form a part of the disclosure and wherein like numerals refer to like parts.

In the drawings:

Figure 2 is a view, partially in section, showing a cooling device for the diluent line.

Figure 3 is a fragmentary view, partially in section, of one end of the flow control valve.

Figure 1:
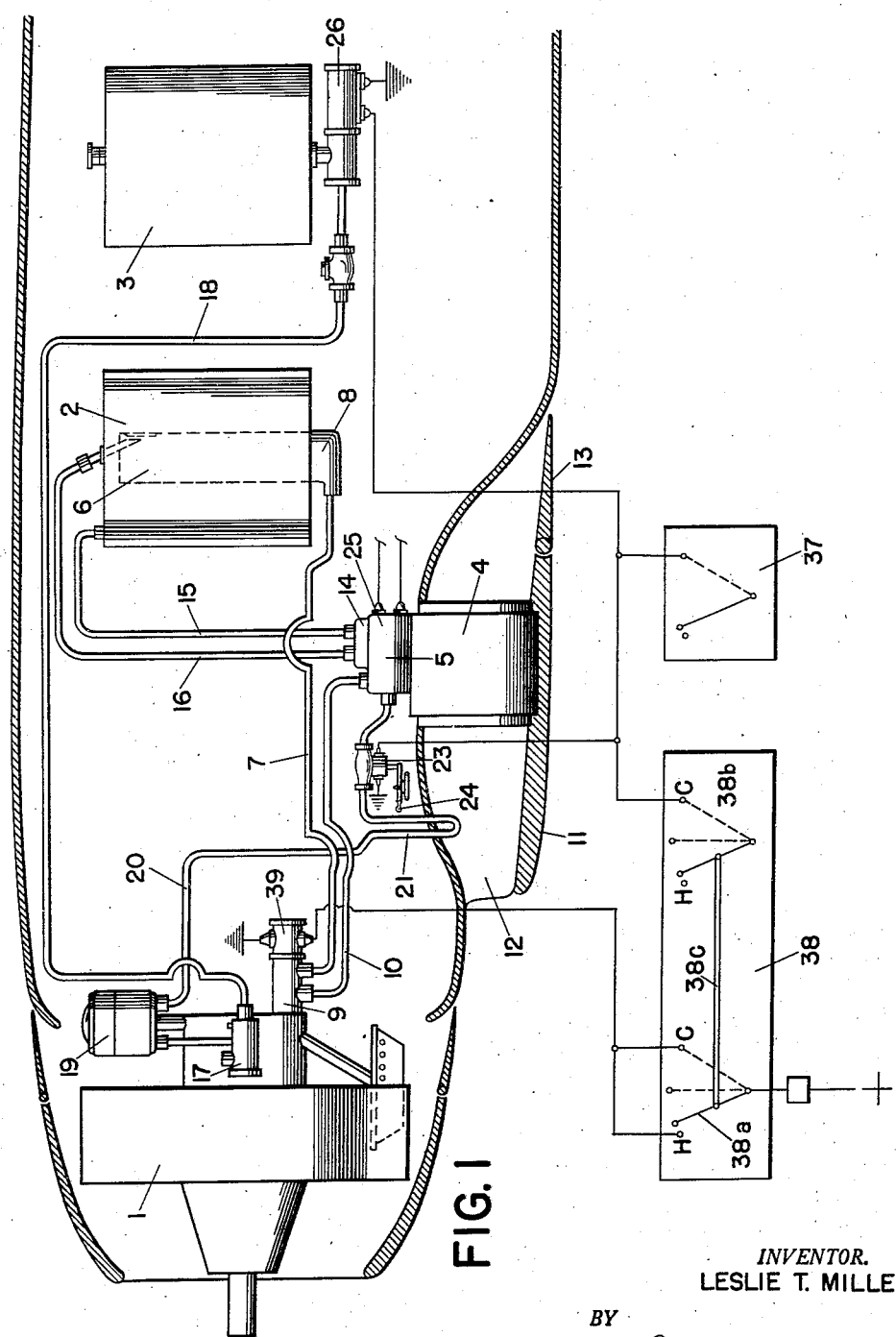
Figure 1 is a diagrammatic view showing the arrangement of the elements comprising the cold weather lubrication system.

Figure 1 of the drawings discloses an engine 1, an oil reservoir 2, a gasoline tank 3, an oil cooler 4, and a valve 5, all inter-connected by means of conduits, the connections and functions of which will be presently set forth.

The oil reservoir 2 has a warm-up compartment 6 located within the main section of the reservoir. This warm-up compartment incloses a small portion of the lubricant in the reservoir 2, and it is so named because the lubricant is drawn from this small compartment to the engine by the pump 9, during the initial starting of the engine, and lubricant is returned from the engine to this compartment so that by circulating this small quantity of lubricant, it reaches a high temperature more rapidly than circulating the whole body of lubricant in reservoir 2. In other words, this compartment is called the warm-up compartment because it confines the oil used during the warming-up period of the engine.

Oil is supplied to the engine through conduit 7 from fitting 8 on the lower portion of the reservoir. Oil pump 9 forces the lubricant to the engine and returns lubricant by way of conduit 10 to the distribution valve 5. This pump may be driven by the engine or independently of the engine by motor 39. It will be noted that oil cooler 4 is located in an air duct 11, which has a forwardly directed opening 12. Flap 13, on the rear portion of the air duct, is operated to open or close this rear portion thereby controlling the flow of air through duct 11. The oil cooler is of the conventional type having a central core for extensive heat exchange between the oil and the cooling medium, air, and a jacket portion through which the oil may be directed for partial cooling during the warming up period of the engine. Valve 5 is so arranged that the lubricant returning through conduit 10 can be directed to flow through the core of the oil cooler or through the jacket, or by-pass the oil cooler entirely through by-pass 14 of the valve. When the return lubricant is directed through the main portion of the oil cooler, the lubricant flows to the reservoir 2 by means of pipe 15. If the valve directs the return lubricant through the jacket of the oil cooler or through the by-pass the lubricant will be returned to the warm-up compartment of the reservoir by way of pipe 16.

An engine-driven fuel pump 17 draws gasoline from tank 3 through pipe 18 to the carburetor 19. A pipe 20 conducts some gasoline from the carburetor to the valve 5. It will be seen from the drawings that pipe 20 has formed therein a loop 21 which projects into the air stream ahead of the oil cooler to insure the diluent being cooled. The diluent may, of course, be conducted directly to the control valve without any additional cooling. A diluent valve 22 is inserted in line 20 to control the flow of diluent to the control valve 5. The diluent valve is a solenoid operated valve, the solenoid being shown at 23, or the valve may be controlled manually through linkage 24.

The flap control mechanism 25 is shown attached to the control valve 5 at the opposite end from the diluent inlet.

An electrically operated motor-pump unit 26 is shown which affords a means of circulating gasoline independently of the engine driven pump 17.

Figure 2 shows the constructional details of a fitting that may be inserted in line 20 which will project into the air stream and afford a diluent cooling means. As pointed out above, this feature is optional.

Figure 3 shows a fragmentary view of the control valve 5 illustrating the end of the valve at which the diluent is introduced. It should be pointed out that any type of multiple control valve of the slide or rotary type may be used but in the preferred form, a rotary valve is shown having multiple ports which are so arranged that for various angular positions of the valve, the distribution functions set forth above are attained; that is, the valve, in response to the temperature of the lubricant, may direct the lubricant through the core of the oil cooler and then to the main section of the reservoir or through the jacket of the oil cooler to the warm-up compartment of the reservoir or by-pass the oil cooler entirely and direct the lubricant from the engine to the warm-up compartment of the reservoir. The end of such a rotary valve 27, is shown in Figure 3 mounted for rotation in a bearing 28. A thermal responsive bi-metallic element 29 is shown having one end 40, attached to the casing of the valve and the other end secured to the shaft of valve 27. Upon variations in temperature, the bi-metallic element will rotate the valve in a predetermined manner. The oil returning through pipe 10 flows over the bi-metallic element 29 before it is distributed by the valve 27; thus, it will be seen that the temperature of the oil determines the position of the valve and thereby the return path of the oil to the reservoir. A spray nozzle 30 is positioned adjacent the bi-metallic element 29 and receives a diluent from pipe 20. By this arrangement, it will be seen that upon the operation of diluent valve 22, the diluent, gasoline, will be introduced into the lubricant by means of the spray nozzle 30 adjacent the bi-metallic element and, if the oil is hot, will cool the oil in the vicinity of the bi-metallic element, thus causing the bi-metallic element to move the valve to a position corresponding to that of a lower temperature lubricant. The diluted oil will flow from the valve to the warm-up compartment of the reservoir by conduit 16.

To the end of the valve 5 remote from the diluent line 20, will be mounted flap control mechanism 25. The position of the flap is determined by the position of the valve 27.

The difficulty in starting an internal combustion engine in cold weather is due primarily to the fact that the viscosity of the oil increases with a decrease in temperature. If an attempt is made to start an engine with oil of high viscosity any of several things may happen. One, the oil pump may circulate the oil of high viscosity and create tremendous pressures in the oil lines and associated equipment such as the oil cooler, such pressures being far in excess of those for which the oil cooler would be designed to promote efficient heat exchange, and as a result, would damage the cooler. Secondly, due to tremendous resistance to the flow of the oil of high viscosity, the supply of lubricant at the bearings and working parts of the engine may be inadequate to properly lubricate the bearing, and failure of the engine may result. To overcome the above difficulties by this invention, it is possible to provide an adequate quantity of diluted lubricant in the warm-up compartment of the oil reservoir for cold start.

The operation of the above described invention is as follows: Before the engine is shut down, the operator may close electric switch 37 which starts auxiliary gasoline pump 26 and energizes the diluent valve solenoid 23, thus causing the diluent to be admitted to the lubrication system in the inlet to valve 5. Since the lubricant flowing in the system at this time will be hot, the diluent will cool lubricant adjacent the thermal element 29 and cause the valve to move to a position that will return the oil to the warm-up compartment of the reservoir. Slight cooling may cause the oil to flow through the jacket of the oil cooler and then to the warm-up compartment or a greater degree of cooling will cause the oil to flow through the by-pass directly to the warm-up compartment. Thus, it will be seen that the oil returned to the warm-up compartment 6 will be diluted, by the addition of gasoline, and a body of oil of low viscosity will be provided in the warm-up compartment for the next cold start of the engine.

If the engine has been shut down so that the lubricant is not circulated by the pump driven by the engine, by means of switch 38, which comprises two switches 38a and 38b actuated by the link 38c, the circuit of motor 39 may be closed by throwing the switch to the "cold weather" position c to circulate the lubricant through the system and at the same time operate the diluent valve and motor-pump unit 26 to add a diluent as required. Thus, if the diluent has not been added to the lubricant before shutting off the engine, it is possible to add diluent without the necessity of restarting the engine. A body of diluted lubricant is thereby provided in the warm-up compartment 6 in the manner described above. If the switch 38 is thrown to the "hot weather" position H, the motor 39 merely drives the lubricant pump and returns the lubricant to the oil tank without the addition of a diluent.

The operation of the flap control in conjunction with the motion of the valve should be obvious from the description of the drawings. This mechanism is so designed that when maximum cooling is desired; that is, when the valve is moved by the temperature of the oil to cause the oil to flow through the core of the oil cooler, the flap control mechanism operates to open flap 13 to permit maximum flow of air. During the initial stages of warming up the engine, it is desirable to retain the heat in the oil until enough has accumulated to lower the viscosity of the oil and, therefore, the oil is not directed through the main body of the cooler but flows through either the by-pass or the jacket of the cooler depending upon the heat content of the oil. Again, due to the coupling of the flap control circuit with a position of the valve, the flap assumes position to restrict the air flow and prevent heat exchange and loss of heat from the lubricant.

By way of example, when the temperature of the lubricant is below 60° F., the valve is actuated by the bi-metallic element to direct oil flow through the by-pass. Above 175° F., the lubricant is directed through the core of the oil cooler. In the range of 100° to 140° F., the flow of lubricant is through the jacket of the oil cooler. In the in-between temperature ranges, the flow is split between the paths of the two adjacent temperature ranges. The valve is also set so that oil above 160° F. is returned to the main section of the oil reservoir and below 130° F., the oil is returned to the warm-up compartment of the reservoir. It can be readily seen that the valve may be so designed and its relation to the thermal responsive element present so that the above described paths for the various temperature ranges may be varied. The main purpose is to insure that the valve will direct the lubricant to the warm-up compartment of the oil reservoir upon the addition of a diluent.

It is to be understood that certain changes, alterations, and modifications may be made in the above described structure without departing from the spirit and scope of the appended claims.

I claim as my invention:

1. In combination, a valve housing having a fluid inlet and a plurality of fluid outlets, a valve having a thermal responsive element located in the flow path of the fluid to actuate said valve in said housing to direct fluid flow from the inlet to one of the outlets, depending upon the heat content of the fluid, means to introduce a second fluid adjacent said thermal responsive element whereby said valve is moved to a position to direct the flow of said first fluid, in accordance with the resulting temperature of the mixture of said first and said second fluids.

2. A fluid flow control valve comprising, a valve housing having a fluid inlet port and a plurality of fluid outlet ports, a valve member for directing the flow of fluid from said inlet port to one of said outlet ports, a thermal responsive element secured to said valve in a position exposed to the flow of fluid whereby said valve is moved to direct the flow of fluid in accordance with the temperature thereof, means to introduce a second fluid adjacent said thermal element so that said thermal element moves said valve to pass the fluid through an outlet port corresponding to the temperature of the resultant mixture of said fluids.

3. A fluid flow control valve comprising a valve housing, a fluid inlet and a plurality of fluid outlet ports in said housing, a valve member having passages formed therein for directing the flow of fluid from said inlet port to one of said outlet ports, a thermal responsive element operatively connected to move said valve, said thermal responsive element mounted in said housing in the path of the fluid flow so that it is exposed to the flow of fluid and responds to the temperature thereof, a spray means adjacent said thermal element whereby a second fluid may be mixed with said first fluid around said thermal element, to control the position of said valve and thereby the flow of fluid through said outlet ports.

LESLIE T. MILLER.